United States Patent [19]

Hiramatsu

[11] Patent Number: 4,624,746

[45] Date of Patent: Nov. 25, 1986

[54] PROCESS FOR CONTROLLING DISTILLATION COLUMN

[75] Inventor: Teruaki Hiramatsu, Omiya, Japan

[73] Assignee: Nippon Zeon Co., Ltd., Tokyo, Japan

[21] Appl. No.: 639,175

[22] Filed: Aug. 9, 1984

[30] Foreign Application Priority Data

Aug. 9, 1983 [JP] Japan ................................ 58-144484

[51] Int. Cl.⁴ ............................................. B01D 3/42
[52] U.S. Cl. .................................. 203/3; 203/DIG. 18;
203/2; 196/132; 364/501
[58] Field of Search .................. 203/3, DIG. 18, 1, 2;
202/160; 196/132; 364/501

[56] References Cited

U.S. PATENT DOCUMENTS

| 3,018,230 | 1/1962 | Morgan | 203/3 |
| 3,449,215 | 6/1969 | Johnson et al. | 203/3 |
| 4,473,443 | 9/1984 | Hobbs | 203/3 |

Primary Examiner—S. Leon Bashore
Assistant Examiner—Andrew J. Anderson

Attorney, Agent, or Firm—Armstrong, Nikaido, Marmelstein & Kubovcik

[57] ABSTRACT

A process for controlling a distillation column in which a feedstock is distilled for separation into a product from the top of the column having a first predetermined content of an intended component with a high boiling point and a product from the bottom of the column having a second predetermined content of an intended component with a low boiling point. The process includes the steps of computing a desired value of the flow rate of the product from the bottom of the column in accordance with a material balance and controlling the flow rate of the bottom product in accordance with a corrected desired value which is derived from one of deviations between the actual and desired compositions of the top or bottom products or limit values depending upon the magnitude and direction of the deviations. Reflux of part of the top product to the column is also controlled in accordance with the direction of the deviations and their magnitudes or limiting values.

1 Claim, 1 Drawing Figure

PROCESS FOR CONTROLLING DISTILLATION COLUMN

BACKGROUND OF THE INVENTION

The present invention relates to a process for controlling a distillation column and, in particular, to a process for controlling a distillation column in which products, each having a predetermined content of a given component are produced from the top and bottom of the column by controlling a discharge rate from either one of the top and bottom of the distillation column.

The products, each having a predetermined content of a given component are sometimes needed to be produced from the top and bottom of the column by controlling the discharge rate of either one of the top and bottom of a distillation column irrespective of changes in a feed rate to the column and components.

SUMMARY OF THE INVENTION

It is therefore an object of the present invention to provide a novel process for controlling a distillation column.

It is another object of the present invention to provide a process for controlling a distillation column in which products, each having a predetermined content of a given component, may be produced from the top and bottom of a distillation column irrespective of changes in a feed rate and components.

In accordance with the present invention there is provided a process for controlling a distillation column in which a feedstock is distilled for separation into a product from the top of the column having a first predetermined content of an intended component with a high boiling point and a product from the bottom of the column having a second predetermined content of an intended component with a low boiling point by controlling the flow rate of either one of the products and a part of said product from the top of the column is refluxed to the column comprising the steps of; computing a desired value of the flow rate of said product from the bottom of the column in accordance with a material balance; controlling the flow rate of said product from the bottom of the column in accordance with a first corrected desired value which is obtained by correcting the desired value of the flow rate of said product from the bottom of the column in response to the larger one of a first deviation between the first content of the intended component with a high boiling point and its desired value and a second deviation between the second content of the intended component with a low boiling point and its desired value when the control directions of the flow rate of said product from the bottom of the column determined by the polarities of the first and second deviations are the same; controlling the flow rate of said product from the bottom of the column in accordance with a second corrected desired value which is obtained by correcting the desired value in response to the second deviation when the control directions of the flow rate of said product from the bottom of the column determined by the polarities of the first and second deviations are different and controlling the reflux rate in response to the larger one of the first and second deviations; and controlling the flow rate of said product from the bottom of the column in accordance with limit values for a given range when the first and second desired values do not fall in said range and controlling the reflux rate in response to said limit values.

Accordingly the contents of the intended components of the products from the bottom and the top of the column may be controlled to a given value by both the control of the flow rate of the product and the control of the reflux rate in accordance with a material balance.

BRIEF DESCRIPTION OF THE DRAWING

These and other purposes, advantages and features of the present invention will become clear by reading the following detailed description of the present invention with reference to the drawing in which.

The attached single drawing which is

DETAILED DESCRIPTION OF THE EMBODIMENTS

Figure 1:
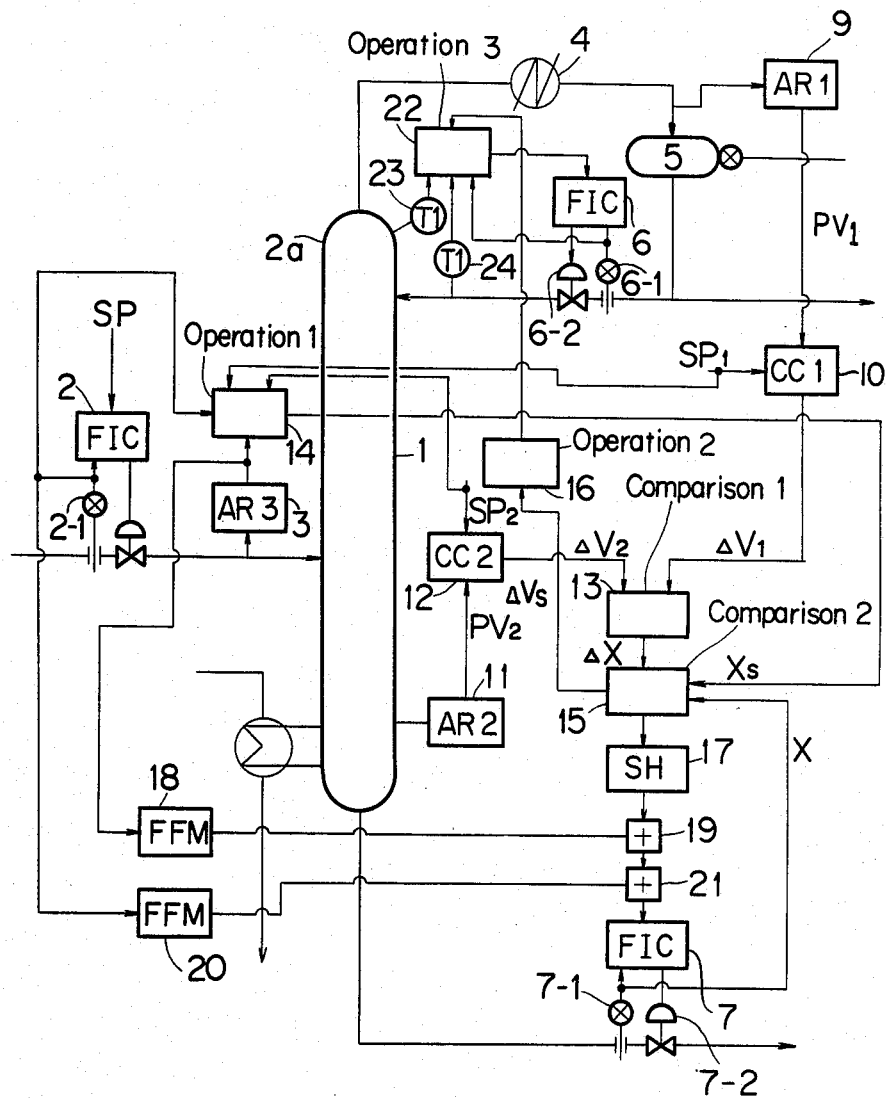
FIG. 1 is a block diagram showing a control system for an embodiment incorporating the present invention.

Referring now to FIG. 1, there is shown an embodiment of the control system of the present invention. Feedstock is supplied to a distillation column 1 under a constant value control by means of flow rate indicating and adjusting unit 2. The composition of the supplied feedstock is measured by an on-line composition analyzer 3.

On the other hand, the product which has been distilled from the column top is supplied to a product reservoir 5 via a heat exchanger 4. The product can be discharged from the product reservoir 5. A part of the product is refluxed to the distillation column 1. The reflux rate is controlled by means of the flow rate indicating and adjusting unit 6. The product from the bottom of the column is discharged via a flow rate indicating and adjusting unit 7.

The composition of the product from the top of the column is measured by an on-line component analyzer 9. The output of the analyzer 9 is applied as a process variable $PV_1$ to an adjustor 10, to which a preset value ($SP_1$) signal is applied. The composition of the product from the column bottom is detected by an on-line component analyzer 11. The output of the component analyzer 11 is applied as a process variable $PV_2$ to an adjustor 12, to which a preset value ($SP_2$) signal is applied. The component analyzers 9 and 11 are adapted to detect the desired component having higher and lower boiling points respectively. The analyzer 3 is adapted to detect at least one of any one of higher and lower boiling point components.

A detection output of the flow rate indicating detector 2-1 of the flow rate indicating and adjusting device 2, an output representative of the content of the desired component in the supplied feedstock detected by the component analyzer 3, a signal representative of the preset value ($SP_1$) and a signal representative of the preset value ($SP_2$) are applied to an operational unit 14. The operational unit 14 computes a flow rate of the product from the bottom $X_s$ in accordance with a material balance as follows:

$$F_s \cdot A_3 = (F_s - X_s)A_1 + X_s \cdot A_2$$

wherein
$F_s$ represents a flow rate of the supplied feedstock;
$A_3$ represents a content of the desired component measured by the component analyzer 3;

$A_1$ and $A_2$ represent a content of the same component of the supplied feedstock with respect to the preset values $SP_1$ and $SP_2$; and $X_s$ represents a flow rate of the product from the column bottom.

Detection deviations $\Delta V_1$ and $\Delta V_2$ are applied to a comparing operational unit 13 from the adjustors 10 and 12. The comparing operational unit 13 computes outputs $F(\Delta V_1)$ and $F'(\Delta V_2)$ corresponding to the amplitude of the deviation as shown in Table 1 in response to the polarity and the amplitude of the detection deviations $\Delta V_1$ and $\Delta V_2$ and provide an output depending on the polarity of the deviations.

TABLE 1

|  | $SP_1 \leq PV_1$ | $SP_1 > PV_1$ |
|---|---|---|
| $SP_2 \leq PV_2$ | The device 13 outputs to reduce the current value X by $F'(\Delta V_2) = \Delta X_2$. | The device 13 selects larger one of $F(\Delta V_1) = \Delta X_1$ and $F'(\Delta V_2) = \Delta X_2$ and outputs to reduce X by it. |
| $SP_2 > PV_2$ | The device 13 selects larger one of $F(\Delta V_1) = \Delta X_1$ and $F'(\Delta V_2) = \Delta X_2$ and outputs to add it to X. | The device 13 outputs to increase X by $F'(\Delta V_2) = \Delta X_2$. |

Table 1 will be described. $PV_1$ approaches $SP_1$ by increasing the flow rate of the product from the bottom of the column when $SP_1 \leq PV_1$. $PV_1$ approaches $SP_1$ by decreasing the flow rate of the product from the bottom of the column when $SP_1 > PV_1$. $PV_2$ approaches $SP_2$ by decreasing the flow rate of the product from the bottom of the column when $SP_2 \leq PV_2$. $PV_2$ approaches $SP_2$ by increasing the flow rate of the product from the bottom of the column when $SP_2 > PV_2$. Accordingly it is proper to increase the flow rate of the product from the bottom of the column when $SP_1 \leq PV_1$ and $SP_2 > PV_2$. There is no contradiction. It is proper to decrease the flow rate of the product from the bottom of the column when $SP_1 > PV_1$ and $SP_2 \leq PV_2$. However contradictory control should be carried out when $SP_1 \leq PV_1$ and $SP_2 \leq PV_2$. In this case the flow rate of the product from the bottom of the column is preferentially decreased. Contradictory control should be carried out when $SP_1 > PV_1$ and $SP_2 > PV_2$. In this case the flow rate of the product from the bottom of the column is preferentially increased. That is, the flow rate of the product from the bottom of the column is controlled by giving priority to the indication by $SP_2$ and $PV_2$.

The output from the comparing operational unit 13 is applied to the comparing operational unit 15 in accordance with Table 1. The comparing operational unit 15 judges the relation $B \cdot X_s \leq X + \Delta X \leq A \cdot X_s$ represented by $\Delta X$ which is output from the comparing operational unit 13 in accordance with Table 1. The comparing operational unit 15 provides an output $(X + \Delta X)$ when $X + \Delta X$ fulfills the above-mentioned condition. The comparing operational unit 15 provides an output $B \cdot X_s$ when the above-mentioned condition is not fulfilled and $B \cdot X_s > X + \Delta X$. The unit 15 provides an output $A \cdot X_s$ when $A \cdot X_s < X + \Delta X$. A and B are constants. $A > 1$ and $B < 1$. X represents flow rate measured by the flow rate detector 7-1 of the flow rate indicating and adjusting unit 7 for measuring the flow rate of the product from the bottom of the column.

The comparing operational unit 15 provides an output $\Delta V_s$ which is a larger one of deviations $\Delta V_1$ and $\Delta V_2$ to an operational unit 16 when $SP_1 \leq PV_1$ and $SP_2 \leq PV_2$, or $SP_1 > PV_1$ and $SP_2 > PV_2$, that is, the flow rate of the product from the bottom of the column is decreased or increased under a contradictory condition of the relation between $PV_1$ and $SP_1$, $SP_2$ and $PV_2$. $\Delta R = f'(\Delta V_s)$ is computed in an operational unit 16. The comparing operational unit 15 provides $B \cdot X_s$ and $(X_s + \Delta X)$ to the operational device 16 when $X + \Delta X$ does not fulfill the relation $B \cdot X_s \leq X + \Delta X \leq A \cdot X_s$. The operational unit 16 computes $$\Delta R = f[B \cdot X_s - (X + \Delta X)] \text{ or}$$

$$\Delta R = f[A \cdot X_s - (X + \Delta X)].$$

A signal $X + \Delta X$, $B \cdot X_s$ or $A \cdot X_s$ from the comparing operational unit 15 is sampled and held by sample hold circuit 17. The hold time is determined depending upon the dead time and delay time of the distillation column established when the extraction flow rate is changed. The output from the sample hold circuit 17 is added with the output of the component analyzer 3 which is applied via a feedforward model 18 by means of an adder 19. The output of the adder 19 is added with the output of the flow rate detector 2-1 which has passed through the feedforward model 20 by means of an adder 21. The output of the adder 21 is applied as a signal representative of a preset value to a flow rate indicating adjustor 7-2 of the flow rate indicating and adjusting unit 7 for presetting a preset value of the flow rate indicating adjustor 7-2.

The output $\Delta R$ of the operational unit 16 is applied to a reflux operational unit 22. Temperature at the top of the column $T_{COH}$ detected by column top temperature indicating detector 23, reflux temperature $T_{REF}$ detected by a reflux temperature detector 24 and the reflux amount $F_{REF}$ detected by the flow rate detector 6-1 of the reflux indicating and adjusting unit 6 are applied to the reflux rate operational unit 22 which computes an internal reflux rate $R_{INT} = F[T_{COH}, T_{REF}, R_{REF}]$. The value $R_{INT}$ is added with an output $\Delta R$ from the operational unit 16 to provide a new internal reflux rate $[R_{INT} + \Delta R] = R_R$. The unit 22 computes a new external reflux rate $R_{REF}$ to provide $R_R = [T_{COH}, T_{REF}, R_{REF}]$ and provides an output.

The output of the reflux rate operational unit 22 is applied as a preset value signal to the flow rate indicating adjusting valve 6-2 of the reflux rate indicating and adjusting unit 6 for presetting a preset value for the flow rate indicating adjusting valve 6-2.

In an embodiment of the present invention as mentioned above, the flow rate of the feedstock supplied to the distillation column is controlled by the flow rate indicating adjusting unit 2. The desired component in the feedstock is measured by the on-line component analyzer 3. The content $A_1$ of the same desired component in the supplied feedstock with respect to the preset value $SP_1$ of the desired component having a high boiling temperature of the product discharged from the top of the distillation column 1, the content $A_2$ of the same desired component of the supplied feedstock with respect to a preset value $SP_2$ of the desired component having a low boiling point, the flow rate of the feedstock and the content of the desired component in the feedstock are applied to the operational unit 14. The operational unit 14 computes an extraction flow rate $X_s$ of the product from the bottom of the column upon the basis of material balance.

The content $B_1$ of the desired component having a high boiling point in the product from the top of the column and the content $B_2$ of the desired component having a low boiling point in the product from the bottom of the column are measured by the on-line component analyzers 9 and 11 respectively and then compared with the preset values $SP_1$ and $SP_2$ by means of the adjustors 10 and 12 respectively. The deviations $\Delta V_1$ and $\Delta V_2$ are compared with each other by the comparing operational unit 13. $\Delta X_1 = F(\Delta V_1)$, $\Delta X_2 = F'(\Delta V_2)$ are computed by the values $\Delta V_1$, $\Delta V_2$ by the device 13 and outputted therefrom in accordance with Table 1 depending upon the polarity of the deviations $\Delta V_1$, $\Delta V_2$. The result of the combination of the deviations $\Delta V_1$ and $\Delta V_2$ are also outputted from the comparing operational unit 13.

The comparing operational unit 15 provides an output $X + \Delta X$ which is a sum of the flow rate of the product from the bottom of the column and larger one of outputs $\Delta X_1$ and $\Delta X_2$ from the comparing operational unit 13 when $SP_1 > PV_1$ and $SP_2 \leqq PV_2$, or $SP_1 \leqq PV_1$ and $SP_2 > PV_2$. The comparing operational unit 15 judges that control be possible only based on material balance and provides an output $X + \Delta X$ when $B \cdot X_s \leqq X + \Delta X \leqq A \cdot X_2$. The flow rate of the product from the bottom of the column is controlled in accordance with a preset value which is a sum of the outputs of the feedforward models 18 and 20.

When $SP_1 \leqq PV_1$ and $SP_2 \leqq PV_2$ or $SP_1 > PV_1$ and $SP_2 > PV_2$ in comparison by the comparing operational unit 13 it is judged that control be impossible in accordance with only $X + \Delta X$ which is computed upon basis of material balance and $\Delta R = f'(\Delta V_s)$ is computed by the operational unit 16. A new reflux rate $R_{REF}$ is computed by the reflux rate operational unit 22 upon the basis of the $\Delta R$. Control of the reflux rate and control of the flow rate of the product from the bottom of the column are simultaneously carried out by using the reflux rate $R_{REF}$ as a preset value for the reflux rate indicating and adjusting unit 6.

When the comparing operational unit 15 judges that $X + \Delta X$ fulfills the relation $B \cdot X_s > X + \Delta X$, it provides an output $B \cdot X_s$. The flow rate of the product from the bottom of the column is controlled in accordance with a preset value which is a sum of the output $B \cdot X_s$ and the outputs of the feedforward model 18 and 20. In this case, $\Delta R = f[B \cdot X_s - (X + \Delta X)]$ is computed in the operational unit 16 in accordance with the outputs $B \cdot X_s$ and $X + \Delta X$ of the comparing operational circuit 16. A new reflux rate $R_{REF}$ is computed in the reflux rate operational unit 22 upon the basis of this $\Delta R$. Control of the reflux rate and control of the product from the bottom of the column are simultaneously carried out using the reflux rate $R_{REF}$ as a preset value for the reflux rate indicating adjusting unit 6.

When the comparing operational unit 15 judges that $X + \Delta X$ fulfills the relation $A \cdot X_s < X + \Delta X$, the unit 15 provides an output $A \cdot X_s$. The flow rate of the product from the bottom of the column is controlled in accordance with a preset value which is a sum of the output $A \cdot X_s$ and the outputs of the feedforward models 18 and 20. In this case, $\Delta R = f[A \cdot X_s - (X + \Delta X)]$ is operated. The new reflux rate $R_{REF}$ is operated in the reflux rate operational unit 22. Control of the reflux rate and control of the flow rate of the product from the bottom of the column are simultaneously carried out using the new reflux rate $R_{REF}$ as a preset value of the reflux rate indicating and adjusting unit 6.

In control of the flow rate of the product from the bottom of the column as mentioned above, since the output of the comparing operational unit 15 is sampled and held by the sample and hold circuit 17 and applied to the adder 19, the output of the sample and hold circuit 19 is not changed during the dead time and the delay time of process.

What is claimed is:

1. A process for controlling a distillation column in which feedstock is distilled for separation into a product from the top of the column having a first predetermined content of an intended component with a high boiling point and a product from the bottom of the column having a second predetermined content of an intended component with a low boiling point by controlling the flow rate of either one of the products and a part of said product from the top of the column is refluxed to the column comprising the steps of:

(a) computing a desired value of the flow rate of said product from the bottom of the column in accordance with a material balance;

(b) controlling the flow rate of said product from the bottom of the column in accordance with a first corrected desired value which is obtained by correcting the desired value of the flow rate of said product from the bottom of the column in response to the larger one of a first deviation between the first content of the intended component with a high boiling point and its desired value and a second deviation between the second content of the intended component with a low boiling point and its desired value when the control directions of the flow rate of said product from the bottom of the column determined by the polarities of the first and second deviations are the same;

(c) controlling the flow rate of said product from the bottom of the column in accordance with a second corrected desired value which is obtained by correcting the desired value in response to the second deviation when the control directions of the flow rate of said product from the bottom of the column determined by the polarities of the first and second deviations are different and controlling the reflux rate in response to the larger one of the first and second deviations; and (d) controlling the flow rate of said product from the bottom of the column in accordance with the limit values for a given range when the first and second desired values do not fall in said range and controlling the reflux rate in accordance with said limit values.

* * * * *